United States Patent
Glatti

[11] 3,911,620
[45] Oct. 14, 1975

[54] MATERIALS WITH A SPECIFIC PHOTO-SELECTIVITY BASED ON SYNTHETIC THERMOPLASTIC POLYMERS AND THEIR USE IN THE AGRICULTURAL FIELD

[75] Inventor: Flaviano Glatti, Mestre, Italy

[73] Assignee: Montecatini Edison S.p.A., Milan, Italy

[22] Filed: May 21, 1971

[21] Appl. No.: 145,862

Related U.S. Application Data

[63] Continuation of Ser. No. 798,781, Feb. 12, 1969, abandoned, which is a continuation-in-part of Ser. No. 603,388, Dec. 20, 1966, Pat. No. 3,542,710.

[30] Foreign Application Priority Data
Feb. 14, 1968    Italy................................ 12723/68

[52] U.S. Cl............................................ 47/58; 47/17
[51] Int. Cl.$^2$...................... A01G 9/14; C08F 29/18
[58] Field of Search .................... 47/17, 58; 260/23; 161/408, 27; 313/108.9

[56] References Cited
UNITED STATES PATENTS

| | | | |
|---|---|---|---|
| 2,639,550 | 5/1953 | McKee...................................... | 47/17 |
| 3,043,709 | 7/1962 | Amborski ............................ | 47/17 X |
| 3,287,586 | 11/1966 | Bickford ............................. | 313/109 |
| 3,352,058 | 11/1967 | Brant...................................... | 47/58 |
| 3,395,487 | 8/1968 | Long et al............................... | 47/58 |
| 3,542,710 | 11/1970 | Glatti..................................... | 260/23 |

FOREIGN PATENTS OR APPLICATIONS

| | | |
|---|---|---|
| 1,511,160 | 12/1967 | France |
| 28,344 | 12/1965 | Italy |

*Primary Examiner*—Robert E. Bagwill
*Attorney, Agent, or Firm*—Karl F. Ross; Herbert Dubno

[57] ABSTRACT

A transparent or translucent sheet material (in the form of film or plates) for use in enclosing plant-growth environments (e.g. greenhouses) which is composed of a synthetic resin material to which dyestuffs or coloring matter is added. The composition of the synthetic resin material is such that the minimum light transmittance thereof lies within one of three primary spectral zones, namely 4,100 A to 4,500 A, 4,900 A to 5,400 and 5,250 A to 5,750 A. The maximum transmittance lies in the range of 6,300 A to 7,500 A. The maximum transmittance zone should include a secondary zone of 6,300 A to 6,600 A in which the transmittance at a maximum is greater than 50% and a secondary zone of 6,600 A to 7,500 A in which the maximum transmittance exceeds 70%.

2 Claims, No Drawings

MATERIALS WITH A SPECIFIC PHOTO-SELECTIVITY BASED ON SYNTHETIC THERMOPLASTIC POLYMERS AND THEIR USE IN THE AGRICULTURAL FIELD

This application is a continuation of application Ser. No. 798,781, filed Feb. 12, 1969, now abandoned which is a continuation-in-part of my application Ser. No. 603,388 filed Dec. 20, 1966, now U.S. Pat. No. 3,542,710, filed Nov. 24, 1970.

My present invention relates to transparent materials with photoselectivity and, more particularly, to transparent material adapted to effect plant growth and the like.

In my copending application mentioned earlier, I have pointed out that controlled growth of plants can be effected in greenhouses and the like by shielding them in whole or in part with a transparent sheet material of particular characteristics. It is emphasized there that prior-art systems have shielded plant beds or individual plants from atmospheric conditions with the aid of glass, the enclosure being designed to maintain a predetermined humidity within the plant-growth space and prevent it from being subjected to temperature extremes, while admitting useful light energy to promote or control plant germination, development and growth. Because the translucent glass sheets were not desirable for numerous reasons, i.e. they had to be pressed in frames and mounted in structures reinforced to take up the mass of the glass and the frames, they were unsatisfactory for growth-forcing and protection of vegetables, flower and fruit cultivation, etc. I provided a novel form of plant-shielding sheet material adapted to overcome these disadvantages. As noted in application Ser. No. 603,388, an enclosure of covering material for plant beds and growth chambers comprises a transparent vinyl-chloride-based polymeric sheet material containing a major portion of a polymeric component consisting of at least 75% by weight of chemically combined vinyl chloride. In addition, the sheet material comprises a stabilizing component effective against thermal deterioration of the sheet material, a component capable of absorbing ultraviolet radiation, a plasticizing component and at least one thermoplastics dyestuff, preferably of the phtalocyanine or azo type. Compositions of this general type wherein, however, the several components are carefully selected, are effective for the controlled growing of plants of all types, in spite of the fact that one would normally consider a colored synthetic-resin sheet material to be practically useless and undesirable for growth forcing, controlled growing, and growth protection of fluid, flowers and vegetables.

The vinyl-chloride polymer component of this system consists essentially of 75% by weight of chemically combined vinyl chloride, either in the form of a homopolymer or as a copolymer of vinyl chloride with one or more vinyl compounds copolymerizable therewith (e.g. vinyl acetate). For enclosure of plant growth regions, I prefer to use polymers of this class which are formed by polymerizing vinyl chloride alone or in admixture with up to 25% by weight of monomers copolymerizable therewith in aqueous suspension to yield polymeric material having a K-number between 60 and 90 (preferably a K-number of 70). The polymer component may consist of a major proportion of such vinylchloride-based homopolymers or copolymers in mutual admixture with less than 50% by weight of a compatible synthetic resin of the acrylic or ABS type. The latter include acrylic components with or without butadiene and styrene. The term "acrylic-resin" refers to acrylonitrile polymers and copolymers and, therefore, includes polyacrylonitriles. The ABS terpolymers (i.e. acrylonitrile-butadiene-styrene polymers) can be of the type which are formed in an aqueous suspension or latex of a synthetic elastomer to which is graft polymerized an acrylic monomer (i.e. acrylonitrile). Thus the acrylonitrile component of the terpolymer can be any of the substituted acrylonitriles alone or together with acrylonitrile while the styrene-based component can be styrene or a substituted styrene; suitable polymeric materials are those made by the processes described in the U.S. Applications Ser. No. 257,874 filed on Feb. 12, 1963, Ser. No. 329,952 filed on Dec. 12, 1963, now U.S. Pat. No. 3,332,918 and Ser. No. 403,322 filed on Oct. 12, 1964.

The thermal-stabilizing component, which is incorporated in the sheet material described in application Ser. No. 603,388, in an amount (total) ranging between 0.5 and 40 parts by weight per 100 parts of vinylchloride, is composed of two stabilizing compositions including a first stabilizer constituted by barium, cadmium, lead, zinc, tin or magnesium polymer-stabilizing compounds alone or in mutual admixture and a second stabilizer consisting of one or more epoxy compounds (i.e. having at least one epoxy group per molecule and containing from 22 to 150 carbon atoms per molecule.)

The ultraviolet-absorber component was described as present in an amount ranging from 0.05 to 2 parts by weight per 100 parts by weight of vinylchloride, and could be any of the conventional U.V.-light absorbers hitherto proposed for incorporation in translucent and transparent polymeric materials. The preferred absorbers were benzophenone, triazole and substitute benzophenones and triazoles, alone or in mutual admixture and, preferably, with at least one optical bleaching agent or bluing agent.

The plasticizing component of the earlier system is constituted by one or more vinylchloride plasticizers of the phthalic type having alkyl chains of 4 to 13 carbon atoms, or other diesters or diesterifiable compounds with alkyl chains of 4 to 13 carbon atoms. These plasticizers include alkyl adipates, alkyl sebacates and alkyl azelates; inorganic-type or phosphate plasticizers such as alkyl and aryl phosphates and phosphites were also suitable. Other plasticizing agents suitable for use include aralkyl hydrocarbons having relatively long alkyl chains attached to ring nuclei (e.g. dodecylbenzenes chlorinated paraffins and like compounds commonly used heretofore as plasticizers for vinylic polymers).

The lubricating component to be incorporated in a sheet or foil for growth-controlling techniques, according to my prior application is selected from the group consisting of the higher aliphatic acids having from 12 to 24 carbon atoms and salts of such acids with barium, cadmium, zinc, calcium and lead, such salts being formed by reacting directly or in solution the higher aliphatic acids with the oxides, hydroxides or carbonates of these metals; paraffinic waxes, polyamidic waxes; low-molecular-weight polyethylenes; silicone oils; and higher aliphatic alcohols. The higher aliphatic alcohols and acids of the lubricating component should contain 12 – 24 carbon atoms and stearic, lauric, palmitic, myristic acids, the corresponding alcohols and the barium, cadmium, zinc, calcium and lead salts of these acids were found to be the most desirable.

The coloring component preferably includes one or more blue, red, violet, green or yellow dyes of the type hitherto proposed for the dyeing of vinylic polymers. It was described to be of considerable advantage to use especially blue, red and violet sheet materials. When blue-colored sheet materials were desired, the dye was preferably of the phthalocyanine type, whereas the red dyes for use in accordance with the present invention are of the azoic type. Preferred types of dyes are indigoid, anthroquinone, phthalocyanine and indanthrene pigments.

While fairly wide ranges of the various components were used in the sheet materials of application Ser. No. 603,388, it was found that, for optimum growth-control results, it is important to limit the various components to the ranges set forth below (given per 100 parts of the polymer content, e.g. 100 parts by weight of vinylchloride polymer):

I 100 parts by weight of vinylchloride polymer
II thermal-stabilizing component: 0.5 to 40 parts by weight
  IIa first stabilizer = 0.5 to 10 parts
  IIb second stabilizer = 0.5 to 30 parts
III ultraviolet absorber component = 0.05 to 2 parts by weight
IV plasticizing component = 10 to 100 parts by weight
V lubricating component = 0.05 to 5 parts by weight
VI coloring component = 0.00001 to 5 parts by weight.

It is the main object of the present invention to extend the principles originally set forth in my application Ser. No. 603,388 to further growth control or growth promotion of plants by improvement in the translucent or transparent materials employed as enclosures for them.

A further object of this invention is the provision of synthetic thermoplastic materials, especially sheet materials or thermoplastics in the form of translucent or transparent films, foils, plates or sheets, with improved optical characteristics adapted to facilitate growth-forcing and protection of plants for various purposes, thereby enabling the replacement of glass where the same has been used hitherto for these ends.

Still another object of this invention is the provision of thermoplastic translucent or transparent sheet material with improved optical properties for the protection of plants and, in general, for the control of horticulture, floriculture and fruit culture.

Still another object of this invention is to improve the growth-forcing and protection including techniques described in my application Ser. No. 603,388, through the use of synthetic thermoplastic material having greater photoselectivity than has been attainable heretofore.

My present invention constitutes an improvement over that described in application Ser. No. 603,388 and is based upon the discovery that, under certain conditions, surprising and unexpected results in plant growth and culture can be obtained when the synthetic polymeric translucent or transparent materials are given a photoselectivity by the incorporation therein of substances capable of influencing light absorption in particular spectral ranges to specified degrees. The results are indeed surprising since certain substances which have absorption spectra relatively similar to one another may be incorporated in or omitted from the thermoplastic compositions and are found to have growth controlling effects which may be qualitatively and quantitatively different in ways wholly unexpected from the similarity of their absorption spectra.

In specific terms, it may be stated that the present invention resides in the incorporation of a dyestuff component or "coloring matter" in the thermoplastic composition which has a maximum absorption (minimum transmittance in the spectral range between 3,800 A to 5,900 A, the absorption and transmittance being measured in percent (percent of incident light absorbed or percent of incident light transmitted, respectively). The minimum transmittance should lie, in accordance with the present invention, within one of three relatively narrow "primary" spectral zones which are 4,100 A to 4,500 A, 4,900 A to 5,400 A and 5,250 A to 5,750 A, respectively. The maximum transmittance should lie above the upper limit of the last of these zones and preferably the transmittance should exceed 70% in the secondary spectral zone from 6,600 A to 7,500 A.

As previously indicated, the basic thermoplastic composition is preferably that set forth in application Ser. No. 603,388; in general terms, however, the composition may include up to seven components as outlined below:

1. A thermoplastic polymeric component, easily transformable into film, plates and the like, such as polyvinylchloride, polyethylene, polypropylene, polymethylmethacrylate, ethylenevinylacetate copolymers and polyamides. These thermoplastic materials may be used alone or in mutual mixture.
2. A stabilizing component effective against heat and light and constituted by barium-, cadmium-, lead-, zinc-, tin-, or magnesium-compound stabilizers, alone or in mutual admixture.
3. A thermal and light costabilizing component, which is preferably present but may be omitted, constituted by one or more organic compounds containing in the molecule at least one epoxy group and, most suitably the higher epoxy esters containing from 22 to 150 carbon atoms in a carbon chain.
4. A U-V absorbing component, preferably present but which can be omitted, capable of absorbing ultraviolet rays and of the known types mentioned earlier, generally based on benzophenones or on simple or substituted triazoles, optionally combined with a blueing agent or an optical whitening or bleaching agent.
5. A plasticizing component, which preferably is present but may be omitted, constituted by a mixture of one or more plasticizers of the phthalic type with a number of carbon atoms in the alkyl chain (carbon similar) ranging from 4 to 13, optionally used in conjunction with antioxidizing substances such as substituted phenols, alone or in combination with polyalcohols, also in admixture with plasticizers of a type different from the phthalic esters, such as: (a) alkyl adipates with 4 to 13 carbon atoms in the alkyl chain; (b) alkyl sebacates with 4 to 13 carbon atoms in the alkyl chain; (c) alkyl azelates with 4 to 13 carbon atoms in the alkyl chain; (d) alkyl or aryl phosphates and phosphites or polymeric phosphites; (e) alkylaromatic hydrocarbons, e.g. dodecylbenzenes and homologues thereof; and (f) chlorinated or sulphonated paraffins.

6. A lubricating component, which preferably is present but may be omitted, containing one or more of the following compounds: (a) higher aliphatic acids with 12 to 24 carbon atoms, such as stearic acid, lauric acid, palmitic acid, and myristic acid or their barium, cadmium, zinc, calcium and lead salts; (b) paraffin waxes; (c) polyamide waxes; (d) low-molecular-weight polyethylenes; (e) silicone oils; (f) lubricating mineral oils; and (g) higher aliphatic alcohols containing from 12 to 24 carbon atoms.

7. A coloring component consisting of one or more conventional dyestuffs of such type and in such quantity that the thermoplastic materials, in the forms of films, plates and the like have an absorption spectrum characterized by at least a maximum absorption (in percent) or minimum transmittance between 3,800 A and 5,900 A. Best results, as has been noted, are obtained with materials with minimum transmittance in one of the following spectral zones:

from 4,100 A to 4,500 A;
from 4,900 A to 5,400 A; and
from 5,250 A to 5,750 A.

Preferably the maximum transmittance is greater than 50% in the spectral zone from 6,300 A to 6,600 A and greater than 70% in the spectral zone from 6,600 A to 7,500 A.

For illustrative purposes and to clarify this invention, several types of dyeing or coloring substances will be indicated, the use of which has proved to be particularly advantageous for the purposes of this invention. In the case of the preparation of materials having a minimum transmittance (in percent) in the spectral zone from 4,100 A to 4,500 A, azoic dyes derived from acetylacetoarylides and from pyrazolone proved to be particularly suitable. In the case of materials showing a minimum transmittance percentage in the spectral zone from 4,900 A to 5,400 A, the high-molecular weight azoic dyes derived from pyrazolone proved to be particularly suitable. Finally, for materials with a minimum transmittance percentage in the spectral zone 5,250 A to 5,750 A vat dyes derived from thioindigo were found to be particularly convenient.

The quantity of the dyestuff to be used may vary considerably, depending on the optical characteristics to be conferred to the polymeric material in the form of films or plates.

More particularly, in the case of materials with a minimum total transmittance percentage of 20%, 40% and 60%, respectively in the spectral zones: 4,100 A – 4,500 A, 4,900 A – 5,400 A, and 5,250 A – 5,750 A, quantities of dyestuffs of the above-cited type were used (per 100 parts by weight of the polymer component) within the ranges of: 0.01 to 0.2 parts by weight, 0.01 to 0.5 parts by weight, and 0.01 to 1 parts by weight, respectively.

The actual composition of the polymeric materials according to the invention varies in dependence upon the additives used for components (2) to (6), supra.

Best results are obtained using transparent colored polymeric materials in the form of films, containing (for each 100 parts by weight of synthetic thermoplastic polymer):

0.5 to 10 parts by weight of the stabilizing component effective against heat and light;

0 to 30 parts by weight of the costabilizing component (effective against heat and light);

0 to 2 parts by weight of the ultraviolet-ray absorbing component;

0 to 100 parts by weight of the plasticizing component;

0 to 5 parts by weight of the lubricating component;

0.00001 to 5 parts by weight of the dyeing component.

Below is given a typical composition within the scope of the present invention:

| | | |
|---|---|---|
| Sicron 548 (trademark of Montecatini Edison S.p.A.) homopolymer prepared by suspension polymerization of vinyl chloride | 100 parts by weight | |
| Barium-cadmium thermal stabilizer (Ba/Cd ratio = ½) | 3 | " |
| Epoxidized soybean oil | 5 | " |
| 2-hydroxy-4-methoxybenzophenone | 0.25 | " |
| Dioctylphthalate (with 0.2% by weight bisphenol A) | 50 | " |
| Tricresylphosphate | 10 | " |
| Stearic acid | 0.5 | " |
| Dyeing substances | 0.1 | " |

The polymeric materials according to the invention, in the form of films, containing the synthetic thermoplastic polymer in admixture with the additive components (2) to (6), supra, may be transformed into films and plates by the methods described in application Ser. No. 603,388 and those commonly used in the field of plastic processing. For example, colored films of the polymeric materials according to the invention may be prepared by the extrusion of granules or powders (dry-blends) which may be partially gellified constituted by the synthetic polymer in admixture with the above-mentioned additives.

This mixture, both in the form of powders as well as of granules, is obtained by first mixing cold and then at temperatures of up to 120°C the polymer with the additives. This mixture (dry-blend) is transformed into a homogeneous mass, at a temperature varying between 120°C and 180°C (up to fusion) and is then introduced into a granulator, constituted, for instance, by an extruder fitted with an apertured head provided with a rotating chopping blade at the end of the extrusion head.

The granules thus obtained are then transformed into films or plates on extruders with heads suitably shaped to meet the various requirements of use.

The polymeric materials according to this invention, both in the form of plasticized films as well as of plasticized or rigid plates, show by comparison with glass, a greater resistance to impact, a reduced specific weight, and a lower setting-up cost because of the less expensive supporting structures required.

The polymeric materials according to this invention are preferably characterized, in the form of plasticized films in which the polymeric component is polyvinylchloride, by the following mechanical properties:

Elastic modulus (ASTM D 882) greater than 0.3, but preferably between 0.7 and 1.5 kg/mm$^2$;

Breaking load (ASTM) greater than 0.7, but preferably from 2 to 3 kg/mm$^2$;

Percent elongation at break, longitudinally, (ASTM D 882) greater than 100%, but preferably between 250 and 400%;

Tear resistance (ASTM D 689):
longitudinally greater than 2,000, but preferably between 4,000 and 8,000 g/mm;

transversally greater than 2000, but preferably between 3,500 and 8,000 g/mm;

Static thermal stability, unaltered after 200 minutes at 170°C;

Stability to light with the weather-O-meter (E 42/66) unaltered after 1,000 hours, In the case of plates, the materials according to this invention, are characterized by the following mechanical properties:

Breaking load (ASTM D 638) greater than 2, but preferably comprised between 3 and 7 kg/mm$^2$;

Izod resistance at 23°C (ASTM D 256) greater than 2.5 kg/cm/cm;

In this case the stability to heat and light remains practically unaltered.

The following Examples are given to better illustrate the invention.

EXAMPLE I

Three films were prepared with a thickness of 0.15 mm from a polymeric composition of the following composition:

Polyvinyl chloride, Sicron 548
(Trade Mark of Montecatini Edison S.P.A.)...100 parts by weight
Plasticizers (mixture of phthalic ester and epoxided soybean oil)...52
Stabilizer (complex based on barium and cadmium soaps)...3
Dyeing substance; omitted in films "C";
0.2 by weight of violet dye
Vat/Violet/2 (color index No. 73385) in film "A" and 0.09 parts by weight of blue due constituted by a non-chlorinated phthalocyanine (Color index No. 74160) in film "B"...0.09-0.2
UV-absorber (UV9)...0.2

These films were, furthermore, characterized by the mechanical properties reported in Table I.

Except for the optical characteristics, all the other properties were perfectly identical for the three types of materials tested.

In Table II are reported the optical characteristics of the three materials tested.

TABLE II

| A | Film A direct | total | Film B direct | total | Film C total |
|---|---|---|---|---|---|
| 3000 | 0 | 0 | 0 | 0 | 13 |
| 3250 | 0 | 0 | 0 | 0 | 5 |
| 3500 | 4.5 | 4.5 | 1 | 4 | 14 |
| 3750 | 31 | 45.5 | 35 | 40 | 56 |
| 4000 | 47 | 66.5 | 66 | 75 | 82 |
| 4250 | 58 | 74 | 73 | 83 | 84.5 |
| 4500 | 60.5 | 73 | 76 | 87.5 | 87.5 |
| 4750 | 59 | 70 | 77 | 88.5 | |
| 5000 | 48 | 58 | 73 | 87 | 88.5 |
| 5250 | 31 | 42.5 | 66 | 79 | |
| 5500 | 30.5 | 38 | 45 | 57 | 89 |
| 5750 | 30 | 41 | 29 | 41.5 | |
| 6000 | 46.5 | 60.5 | 28 | 38 | 89.5 |
| 6250 | 63 | 82.5 | 38 | 42 | |
| 6500 | 70.5 | 87.5 | 52 | 69.5 | 90.5 |
| 6750 | 74 | 89 | 49 | 69 | |
| 7000 | 76 | 89.5 | 50 | 58.5 | 91 |
| 7250 | 77 | 90 | 61 | 65 | |
| 7500 | 77.5 | 90 | 73 | 77.5 | 91 |
| 7750 | 78 | 90.5 | 79 | 86.5 | |
| 8000 | 78 | 90.5 | 82 | 90 | 91 |
| 8250 | 78.5 | 90.5 | 83 | 91 | |
| 8500 | 78.5 | 91 | 84 | 91.5 | 91 |

The measurements of total transmission (transmittance) were carried out by means of a Hitacki Perkin Elmer spectrophotometer, fitted with a integrating sphere, suitably adapted for this kind of determination.

No data of transmittance were reported for the wavelength lower than 3,000 A, since in this range of wavelengths solar radiations are almost completely absorbed by the atmosphere, and therefore are not involved in the growth of plants.

The film marked A is the violet film (according to the present invention); film B and C are respectively blue and colorless films (given for comparative purposes). The first column represents the direct transmittance, while the second column relate to the total transmittance. For the colorless film only the total transmittance is recorded.

The quantity of dye used was sufficient to ensure in both cases a minimum direct transmittance of about 30% for the wavelength characteristic of the coloring

TABLE I

| Type of Determination | | | Method of Analysis | Value |
|---|---|---|---|---|
| Specific weight at 23°C gr/cc | | | ASTM | 1.235 |
| Temperature Cold Flex °C | | | D1043 - 61T | − 21 |
| "Shore" hardness | | | | 82 |
| Modulus kg/mm$^2$ | on film | | | 1.30 |
| '' | longitudinally | | D882 - 61T | 2.55 |
| Breaking load '' | | | | 340 |
| Elongation % | | | | |
| Modulus kg/mm$^2$ | on film | | | 1.20 |
| '' | | | D882 - 61T | 2.50 |
| Breaking load '' | transversally | | | 350 |
| Elongation % | | | | |
| Burst resistance kg/cm$^2$ | | | | 2.90 |
| ELMENDORF tear resistance on film, | longitudinally | gr/mm | at 23°C D1922 - 61T | 4300 |
| '' | transversally | gr/mm | | 5000 |
| ELMENDORF tear resistance on film, | longitudinally | gr/mm | at 10°C D1922 - 61T | 2800 |
| '' | transversally | gr/mm | | 3500 |
| ELMENDORF tear resistance on film, | longitudinally | gr/mm | at 0°C D1922 - 61T | 2300 |
| '' | transversally | gr/mm | | 2600 | material. More particularly, the violet film has a minimum direct transmittance of 30% at 5,750 A, while the blue film has a minimum direct transmittance of 28% at 6,000 A. As can be seen from the table, in the spectral region comprised between 3,000 A and 6,000 A, the two materials show absorption spectra that are rather similar from the qualitative (position of the maxima and of the minima of transmittance) and quantitative (transmittance values) points of view. The only difference to be appreciated concerns the shifting towards the infrared zone of the minimum absorption peak, which for the two materials is respectively at 5,750 A for the violet films and at 6,000 A for the blue film.

On the contrary, as far as the spectral zone between 6,000 A and 8,500 A is concerned, it will be seen that the violet film shows a behaviour very similar to that of the colorless film, while the blue film has a second minimum of absorption between 6,750 and 7,000 A (50 percent of direct transmittance).

The tests for determining the agronomical (plant-growth) characteristics of the film of the above-described type were carried out in the following way.

Nine small greenhouses made of wood were used, of identical building characteristics, with a covered area of 4.25 square meters each, with a unit volume of 2,5 m.$^3$/m$^2$, fitted with a door which was used also for the aeration of the interior of the greenhouses. They were placed on the experimental farm of Piaggia, Italy, close to the Institute of Agronomy of the University of Pisa, all greenhouses being oriented in northsouth direction, earth free of trees and quite distant from buildings.

These nine small greenhouses had been subdivided into three groups of three greenhouses each, for each of which respectively the violet, the blue and the colorless films described above were used as covering material.

The arrangement of the successive series of greenhouses, covered with the materials of different optical selectivity, were carried out in such a way as to have the greenhouses arranged so as to eliminate the influence of location, soil characteristics, etc.

The cultivation set up was that of the tomato (Marmande variety) twelve plants of which were planted in each greenhouse.

The cultivation tests were carried out during the year 1967, in the period from Jan. 12, 1967 to June 20, 1967. The results obtained have been summarized in the following Table III:

TABLE III

| Agronomical data | Type of film | | |
|---|---|---|---|
| | A (violet) | B (blue) | C (colorless) |
| Total production (gr) | 3241 | 2002 | 2553 |
| Average weight of fruits (gr) | 131 | 82 | 93 |
| Precocity index (days) | 138 | 140 | 135 |
| Maximum number of floreal elements | 43 | 40 | 48 |
| Setting index | 0.58 | 0.62 | 0.54 |

The data recorded in Table III represent the average of the determinations for each greenhouse. From the above indicated data, the considerable improvement surprisingly achieved by the use of the films according to this invention, becomes quite apparent.

More particularly, it can be appreciated that the use of films according to the invention allows one to obtain total productions which are considerably superior to those attainable with the use of colored films of slightly different optical characteristics, as well as with the use of colorless films.

As a matter of fact, by comparison to the blue colored films, total production is increased by 62%, while in comparison to the colorless films, total production is increased by 27%.

EXAMPLE II

Following the procedures described in the preceding Example, films of 0.15 mm thickness were prepared, having the same mecanical characteristics, but of a yellow and red color. For each of the colors, films were prepared with three different shades of color. More particularly, for each color were prepared films with a color shade of such a type as to show for the yellow films a total minimum transmittance of respectively 20%, 40% and 60%, for a wavelength equal to 4,250 A; and for the red film a total minimum transmittance value of respectively 20%, 40% and 60% for a wavelength equal to 5,250 A. In this connection, as yellow dye, the product was used known as Pigment Gelb 83, in quantities equal to 0.09, 0.05 and 0.025 parts by weight per 100 parts by weight of vinylchloride polymer. As red dye an azoic dye was used of high molecularweight, known as azoic AD, in quantities equal to respectively 0.17, 0.09 and 0.048 parts by weight.

In this case the films did not contain any UV absorber but were otherwise identical to the composition of Example I.

In the following table are reported the data of transmittance percentage, both direct and total, according to the variations of the wavelength.

TABLE IV

| Wave length A | VALUES OF TRANSMITTANCE PERCENTAGE | | | | | | | | | | |
|---|---|---|---|---|---|---|---|---|---|---|---|
| | $Y_1$ | | $Y_2$ | | $Y_3$ | | $R_1$ | | $R_2$ | | $R_3$ |
| 3000 | 5 | 5 | 100 | 10 | 21 | 21 | 0 | 0 | 14 | 14 | 14 | 14 |
| 3250 | 26 | 25 | 52 | 57 | 57 | 53 | 1.5 | 1.5 | 14.5 | 14.5 | 14.5 | 14.5 |
| 3500 | 39 | 66 | 59 | 77.5 | 63 | 78.5 | 24 | 29.5 | 28 | 59 | 30 | 59 |
| 3750 | 45 | 56 | 56 | 70 | 65 | 75 | 55 | 62 | 62 | 75.5 | 62.5 | 78 |
| 4000 | 30 | 35 | 43 | 55 | 59 | 67 | 53.5 | 62 | 64.5 | 70 | 69.5 | 78 |
| 4250 | 18 | 20 | 32 | 40 | 50 | 60 | 49.5 | 55 | 62.5 | 70.5 | 69.5 | 75 |
| 4500 | 20 | 20 | 35 | 41 | 52 | 60 | 42.5 | 44 | 57.5 | 64 | 67.5 | 70 |
| 4750 | 33 | 39 | 51 | 58 | 64 | 72 | 29 | 32 | 46.5 | 55 | 60 | 64 |
| 5000 | 50 | 63 | 64 | 79 | 72 | 86 | 18 | 21 | 36 | 44 | 52 | 61.5 |
| 5250 | 70 | 85 | 81 | 87.5 | 82 | 89.5 | 20.5 | 20 | 39 | 40 | 54.5 | 60 |
| 5500 | 81 | 90 | 82 | 90 | 84 | 90 | 24 | 24 | 43 | 47.5 | 57.5 | 64 |
| 5750 | 84 | 90.5 | 83 | 90 | 85 | 90 | 59 | 55 | 71 | 72 | 76 | 77 |
| 6000 | 85 | 90.5 | 84 | 90.5 | 85 | 90.5 | 77.5 | 84 | 81.5 | 87.5 | 82 | 88 |
| 6250 | 85 | 91 | 84 | 91 | 85 | 91 | 81.5 | 88.5 | 82 | 90 | 84 | 90 |
| 6500 | 85 | 91 | 85 | 91 | 85 | 91 | 83.5 | 89.5 | 83.5 | 90.5 | 85 | 90.5 |

TABLE IV – Continued

| Wave length A | VALUES OF TRANSMITTANCE PERCENTAGE | | | | | | | | | | | |
|---|---|---|---|---|---|---|---|---|---|---|---|---|
| | $Y_1$ | | $Y_2$ | | $Y_3$ | | $R_1$ | | $R_2$ | | $R_3$ | |
| 6750 | 85 | 91.5 | 85 | 91.5 | 86 | 91.5 | 84.5 | 90 | 85.5 | 90.5 | 86 | 90.5 |
| 7000 | 85 | 91.5 | 86 | 91.5 | 86 | 91.5 | 85 | 90 | 86 | 90.5 | 86 | 90.5 |
| 7250 | 85 | 91.5 | 86 | 91.5 | 86 | 91.5 | 85 | 90.5 | 86..5 | 91 | 86.5 | 90.5 |
| 7500 | 85 | 91.5 | 86 | 91.5 | 86 | 91.5 | 85 | 91 | 86.5 | 91 | 86.5 | 91 |
| 7750 | 85 | 91.5 | 86 | 91.5 | 86 | 91.5 | | | | | | |
| 8000 | 85 | 92 | 86 | 92 | 86 | 92 | | | | | | |
| 8250 | 85 | 92 | 86 | 92 | 86 | 92 | | | | | | |
| 8500 | 85 | 92 | 86 | 92 | 86 | 92 | | | | | | |

In Table IV, $Y_1$, $Y_2$ and $Y_3$ are three yellow films which have minimum total transmittance values of respectively 20%, 40% and 60% for a wavelength equal to 4,250 A. $R_1$, $R_2$ and $R_3$ are three red films which show minimum total transmittance values respectively of 20%, 40% and 60% for a wavelength equal to 5,250 A. For each film the first column refers to the direct transmittance, while the second column refers to the total transmittance.

The tests for determining the agronomical characteristics of the films of the above described type were carried out as follows:

18 semi-circular tunnels were used, each of them covering an area of 5.8 square meters having furthermore the following dimensions:

| Width at the base | 1.45 mt. |
|---|---|
| Length | 4 mt. |
| Height at the ridge | 0.98 mt. |

These tunnels were located at the experimental farm "Vaccheria" annexed to the Institute of Agronomy of the University of Pisa, Italy. The tunnels, with a north-east south-west orientation, were arranged in parallel rows at 1.30 meters from each other. The tunnels, furthermore, were spaced from one another by 1 meter. The tunnels were grouped in three groups of 6 tunnels each.

Within each group, each tunnel was covered with one of the above described 6 colored films. In each tunnel 12 tomato plants of the Marmande variety were put into cultivation.

In order to ensure a constant aeration of the inside, holes of 5 cm diameter were made on the covering films, along two rows. The tunnels were arranged to be partially lifted, in order to better aerate the cultivation during the hotter days, without allowing the plants to be directly hit by the outside light. The cultivation was carried out in 1967, in the period from Mar. 15, 1967 to July 22, 1967.

In the following Table the agronomical data are summarized, obtained by using the above described films of different photosensitivity. For comparison the data are also recorded obtained with colorless films of similar chemical and physical characteristics.

From the previously reported data, the influence of the intensity of the coloring with regard to the agronomical characteristics of the films can be seen. More particularly, in the case of the total production, it will be seen that, while for the yellow films the maximum values are attained with $Y_3$ type films (films with a minimum total transmittance of 60% at 4,250 A), for the red films, on the contrary, the maximum values are attained with $R_2$ type films (films with a minimum total transmittance of 40% at 5,250 A).

In the case of the medium weight of the fruits, it will be seen that the most effective films are, for the yellow and the red films, respectively the films of the $Y_3$ and $R_1$ type.

As far as the precocity index is concerned, it will be seen that the yellow films ($Y_1$, $Y_2$ and $Y_3$) all exert practically the same influence, while in the case of the red films it will be noted that the $R_1$ type films exert an action considerably different from that of the other red films of the $R_2$ and $R_3$ type.

In the case of the maximum number of floral elements, the red films practically all exert the same action, while for the yellow films it will be noticed that the films of the $Y_1$ type exert an action considerably superior to that of the $Y_2$ and $Y_3$ type films.

Finally, in the case of the setting index, it will be seen that the red films practically all exert the same action, while in the case of the yellow films it will be noticed that the films of the $Y_3$ type exert an action considerably superior to that exerted by the $Y_1$ type and $Y_2$ type films.

Thus one can see that within the range of the materials having a particular optical selectivity according to this invention, it is possible to chose materials which will promote particular stages of the life of the cultivation. For instance, in the case of the yellow films, when a high total production is required, it is convenient and advantageous to use $Y_3$ - type films, while, on the contrary, when a high value in the maximum number of floral elements is required it will be advantageous to use $Y_1$ - type films. In the case of red films, when a high total production is required, it is convenient to use the $R_2$ type films; on the contrary, when fruits with a high medium weight are required, it will be convenient to use an $R_1$-type film. Finally, in order to increase to a maximum degree the setting index, it is particularly advantageous to use films of the $Y_3$-type.

EXAMPLE III

In order to demonstrate the considerable influence exerted on the agronomical properties by films with different optical characteristics in the spectral zone between 6,000 A and 8,000 A, films were prepared with

TABLE V

| Agronomical Characteristics | TYPE OF FILM | | | | | | |
|---|---|---|---|---|---|---|---|
| | $Y_1$ | $Y_2$ | $Y_3$ | $R_1$ | $R_2$ | $R_3$ | Colorless |
| Total production (gr) | 1522 | 1523 | 1728 | 1588 | | 1419 | |
| Medium weight of fruits (gr) | 110 | 113 | 115 | 121 | 115 | 119 | 105 |
| Precocity index (days) | 107.6 | 108.7 | 107.1 | 111.2 | 107.8 | 108.1 | 106.9 |
| Maximum number of floral elements | 21.3 | 19.5 | 19.3 | 19.4 | 20.3 | 19.2 | 20 |
| Setting index | 0.664 | 0.709 | 0.786 | 0.701 | 0.704 | 0.690 | 0.680 | a different optical selectivity in the spectral region between 6,000 A and 8,000 A.

In this particular case a yellow dye (Pigment Gelb 83) in quantities of 0.025 parts by weight and a blue dye (a non-chlorinated phthalocyanine dye) in quantities of 0.048 parts by weight were used per 100 parts by weight of the polymer, the composition being otherwise the same as that of Example I except that in this case the films did not contain UV-absorbers.

The films C and D had the optical characteristics recorded on the following table VI.

TABLE VI

| Wave length A | Colorless | Transmittance percentage C |  | D |  |
|---|---|---|---|---|---|
| 3000 | 50 | 21 | 21 | 27 | 27 |
| 3250 | 60 | 57 | 53 | 29 | 29 |
| 3500 | 70 | 63 | 78.5 | 35 | 48 |
| 3750 | 75 | 65 | 75 | 60 | 70 |
| 4000 | 80 | 59 | 67 | 69 | 79.5 |
| 4250 | 85 | 50 | 60 | 73 | 84 |
| 4500 | 90 | 52 | 60 | 77 | 88 |
| 4750 | 90 | 64 | 72 | 80 | 89 |
| 5000 | 90 | 72 | 86 | 79 | 87.5 |
| 5250 | 90 | 82 | 89.5 | 73 | 83.5 |
| 5500 | 90 | 84 | 90 | 60 | 70 |
| 5750 | 90 | 85 | 90 | 47 | 60.5 |
| 6000 | 90 | 85 | 90.5 | 47 | 58.5 |
| 6250 | 91 | 85 | 91 | 55 | 61 |
| 6500 | 91 | 85 | 91 | 65 | 74 |
| 6750 | 91 | 86 | 91.5 | 62 | 73 |
| 7000 | 91 | 86 | 91.5 | 65 | 72.5 |
| 7250 | 91 | 86 | 91.5 | 71 | 75.5 |
| 7500 | 91 | 86 | 91.5 | 78 | 83 |
| 7750 | 91 | 86 | 91.5 | 81 | 88.5 |
| 8000 | 91 | 86 | 92 | 83 | 90 |
| 8250 | 91 | 86 | 92 | 84 | 90.5 |
| 8500 | 91 | 86 | 92 | 85 | 91 |

From these data it will be seen that the two films show, within the range 6,000 A – 8,500 A different characteristics, in the sense that, while film C has a value of direct transmittance, which is practically constant with variation of the wavelength, close to 86%, film D has, on the contrary, a direct transmittance increasing from 6,000 A to 6,500 A and then shows a minimum value (62%) for a wavelength equal to from 6,750 A to 7,000 A and further on, for wavelength between 7,500 A and 8,500 A, the optical characteristics are similar to those film C.

Tomato cultivations (of the Marmande variety) were carried out in tunnels, following the same procedures described in Example II, using, as covering materials, C and D type films and colorless films (for comparative purposes).

The agronomical results are summarized in the following table VII:

TABLE VII

| Agronomical characteristics | Type of film C | D | Colorless |
|---|---|---|---|
| Total Production (gr) | 1728 | 1380 | 1419 |
| Medium weight of fruits (gr) | 115 | 106 | 105 |
| Precocity index (days) | 107.1 | 108.1 | 106.9 |
| Max. number of floral elements | 19.3 | 19.7 | 20 |
| Setting index | 0.786 | 0.669 | 0.680 |

It can be seen that the different photoselectivity in the spectral region ranging from 6,000 A to 8,500 A does actually exert a significant action on the agronomical characteristics in general and on the total production in particular.

EXAMPLE IV

In order to demonstrate the considerable influence exerted on the agronomical characteristics by the transparent materials with a different optical selectivity according to this invention, even when used in forcing installations for cultivations different from tomatoes, following the same procedures as those described in Example II, forced cultivations of peppers were conducted under the tunnels.

In this specific case as covering materials for the tunnels, films of the $Y_2$ type (see Example II) and for comparative purposes, colorless films and films simply called F were used. In the case of Film F, a blue dye was used of the type cited in the previous Examples, in a quantity of 0.17 parts by weight.

The optical characteristics of this film F are given in the following Table VIII.

TABLE VIII

| Wave length(A) | Transmittance percentage of Film F direct | total |
|---|---|---|
| 3000 | 7 | 5 |
| 3250 | 7 | 7 |
| 3500 | 7 | 10.5 |
| 3750 | 36 | 36 |
| 4000 | 60 | 69.5 |
| 4250 | 69 | 79 |
| 4500 | 76 | 86 |
| 4750 | 77 | 87.5 |
| 5000 | 73 | 84 |
| 5250 | 57 | 70 |
| 5500 | 27 | 38.5 |
| 5750 | 12 | 21.5 |
| 6000 | 11 | 18.5 |
| 6250 | 20 | 21 |
| 6500 | 36 | 40 |
| 6750 | 32 | 40.5 |
| 7000 | 34 | 35.5 |
| 7250 | 47 | 47.5 |
| 7500 | 66 | 67 |
| 7750 | 77 | 82 |
| 8000 | 81 | 88 |
| 8250 | 83 | 90 |

The cultivations, like those described in Example II, were carried out in 1967 during a period going from Mar. 15, 1967 to July 22, 1967.

The thus obtained agronomical data are summarized in the following Table IX.

TABLE IX

| Agronomical characteristics | $Y_2$ | Type of film F | Colorless |
|---|---|---|---|
| Total production (in gr) | 821 | 249 | 715 |
| Medium weight of fruits (in gr) | 55 | 58 | 55 |
| Precocity index (days) | 130.19 | 137.35 | 135.96 |
| Max. number of floral elements | 7.42 | 5.96 | 7.08 |
| Setting index | 2.18 | 0.93 | 1.95 |

From the above reported data it will be seen that a remarkable positive action exerted by materials with a particular optical photoselectivity, also in the case of cultivations different from those of tomatoes.

EXAMPLE V

A 0.2 mm film of polyvinylchloride of the same kind described in the preceding examples was employed for the forced cultivation of tomato (Supermannande variety). The optical characteristics of this film are reported in the following table X.

TABLE X

| Wave length A | Transmittance | |
|---|---|---|
| | Direct | Total |
| 3000 | 20 | 20 |
| 3250 | 54 | 52 |
| 3500 | 60 | 75 |
| 3750 | 62 | 72 |
| 4000 | 57 | 64 |
| 4250 | 48 | 57 |
| 4500 | 50 | 57 |
| 4750 | 62 | 70 |
| 5000 | 70 | 83 |
| 5250 | 79 | 86 |
| 5500 | 81 | 87 |
| 5750 | 82 | 87 |
| 6000 | 82 | 88 |
| 6250 | 82 | 88 |
| 6500 | 82 | 88 |
| 6750 | 83 | 88.5 |
| 7000 | 83 | 88.5 |
| 7250 | 83 | 88.5 |
| 7500 | 83 | 88.5 |
| 7750 | 83 | 88.5 |
| 8000 | 83 | 89 |
| 8250 | 83 | 89 |
| 8500 | 83 | 89 |

The tests for evaluating the agronomical characteristics of this film were carried out as follows. 30 greenhouses were used for identical building characteristics, each one with a covered area of 49.4 sq.mt and a specific volume equal to 1.85 cub.mt/sq.mt. Each greenhouse was fitted with a door which was used also for the aeration of the inside.

The greenhouses, north-south oriented, were placed in the experimental farm of Vaccheria, close to the Institute of Agronomy of Pisa University, on a ground free from trees and well far from buildings. These 30 greenhouses were gathered in five groups of 6 greenhouses each. Each group of 6 greenhouses comprised a greenhouse, the walls of which were carried by a yellow film of the above described type and, by comparison, a greenhouse the walls of which were covered by a colourless film of the type described in example 1.

Within each group of 6 greenhouses, the mutual location of the greenhouses, covered by the material of different optical selectivity, was performed in such a way to have an arrangement according to the casual law.

The greenhouses were placed at equal intervals and in such a way to avoid any mutual shading.

Other tricks were used to avoid the disturbing action of a possible difference in the characteristics of the soil. In each greenhouse 138 plants of tomato (Supermannande variety) were placed in such a way to have 4 plants for each sq.met. of covered surface. The cultivation tests were carried out during the year 1967, over the period from May 21 to June 10.

The results therein obtained are summarized in the following table XI, wherein the first data related the yellow film while the second data are concerned with the colorless film.

TABLE XI

| | Yellow film | colorless film |
|---|---|---|
| May 21, 1967 | | |
| Number of fruits | 9 | 36 |
| Total weight (g) | 900 | 4640 |

TABLE XI-Continued

| | Yellow film | colorless film |
|---|---|---|
| Average weight (g) | 100 | 128.5 |
| May 24, 1967 | | |
| Number of fruits | 50 | 120 |
| Total weight (g) | 6120 | 15100 |
| Average weight (g) | 122 | 125 |
| May 27, 1967 | | |
| Number of fruits | 234 | 459 |
| Total weight (g) | 32340 | 53050 |
| Average weight (g) | 138 | 115 |
| May 29, 1967 | | |
| Number of fruits | 325 | 473 |
| Total weight (g) | 58100 | 55900 |
| Average weight (g) | 179 | 118 |
| May 31, 1967 | | |
| Number of fruits | 417 | 525 |
| Total weight (g) | 67800 | 57560 |
| Average weight (g) | 162 | 110 |
| June 3, 1967 | | |
| Number of fruits | 783 | 822 |
| Total weight (g) | 102700 | 85810 |
| Average weight (g) | 131 | 104 |
| June 5, 1967 | | |
| Number of fruits | 669 | 680 |
| Total weight (g) | 91230 | 73990 |
| Average weight (g) | 136 | 109 |
| June 7, 1967 | | |
| Number of fruits | 1130 | 1211 |
| Total weight (g) | 157960 | 116580 |
| Average weight (g) | 140 | 96 |
| June 10, 1967 | | |
| Number of fruits | 1945 | 1843 |
| Total weight (g) | 273520 | 163500 |
| Average weight (g) | 140 | 89 |

From the above listed, data, the remarkable improvements surprisingly attained by the use of the films according to this invention become apparent. More particularly it can be seen how the use of films according to the invention permits to obtain a total production which is remarkably higher (especially in the final part of the cultivation) than that one attainable by means of colorless film.

In addition tomatoes with a particularly high average weight could be obtained.

Although the results reported herein have been obtained through the use of photoselective materials based on vinylchloride polymers, similar results can be obtained by the use of photoselective materials based on other thermoplastic polymers, such as for instance polyethylene, polypropylene, ethylene-acetate vinyl copolymers vinyl, polymethylmethacrylate polyamides and the like, to which are added with dyeing materials of such a type as to give rise to the above mentioned optical characteristics.

I claim:

1. In a method of controlling the growth in vegetable, flower and fruit cultivation, the improvement which comprises the steps of enclosing the cultivation at least in part by a tinted nonfluorescent translucent plastic sheet material and exposing the cultivation to transmitted sunlight only through said sheet material, the minimum transmittance of said sheet material lying within one of the spectral ranges:
   4,100 A to 4,500 A,
   4,900 A to 5,400 A, and
   5,250 A to 5,750 A, said sheet material having a transmittance maximum in excess of 50% within the spectral zone of 6,300 A to 6,600 A and greater than 70% within the spectral zone of 6,600 A to 7,500 A, the transmittance being defined as the ratio in percent of transmitted-light intensity to incident-light intensity of the particular frequency.

2. An enclosure for a cultivation comprising a tinted nonfluorescent translucent plastic sheet material and exposing the cultivation to transmitted sunlight only through said sheet material, the minimum transmittance of said sheet matermial lying within one of the spectral ranges:

4,100 A to 4,500 A,
4,900 A to 5,400 A, and
5,250 A to 5,750 A, said sheet material having a transmittance maximum in excess of 50% within the spectral zone of 6,300 A to 6,600 A and in excess of 70% in the spectral zone of 6,600 A to 7,500 A, the transmittance being defined as the ratio in percent of transmitted-light intensity to incident-light intensity of the particular frequency, said sheet material including a polymeric component selected from the group which consists of polyvinylchloride, polyethylene, polypropylene, polymethylmethacrylate, ethylene-vinyl acetate copolymers, polyamides, copolymers and mixtures thereof, a dyestuff constituting 0.00001 to 5 parts by weight per 100 parts by weight of said polymeric component, and at least one additional component selected from the group which consists of:

a stabilizing component present in an amount ranging from 0.5 to 10 parts by weight per 100 parts by weight of said polymeric component;

a co-stabilizing component effective against heat and light and present in an amount ranging from substantially 0 to 30 parts by weight per 100 parts by weight of said polymeric components;

an ultraviolet ray absorbing component present in an amount ranging from substantially 0 to 2 parts by weight per 100 parts by weight of said polymeric component;

a plasticizing component present in an amount ranging between 0 and 100 parts by weight of said polymeric component; and a lubricating component present in an amount ranging from 0 to 5 parts by weight per 100 parts by weight of the polymeric component.

* * * * *